May 15, 1945.  J. M. ENGLISH  2,376,042
BRAKE MECHANISM
Filed July 10, 1944  3 Sheets-Sheet 1

J. M. English
INVENTOR.

BY CA Knowles
ATTORNEYS.

May 15, 1945.  J. M. ENGLISH  2,376,042
BRAKE MECHANISM
Filed July 10, 1944   3 Sheets-Sheet 2

J. M. English
INVENTOR.

BY *CA Snowles.*
ATTORNEYS.

May 15, 1945. J. M. ENGLISH 2,376,042
BRAKE MECHANISM
Filed July 10, 1944  3 Sheets-Sheet 3
Fig.5. 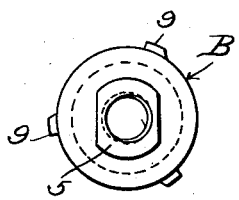 Fig.6. 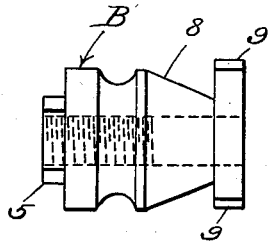 Fig.7. 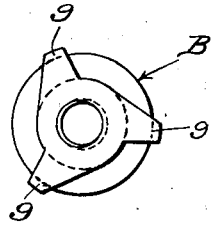
Fig.8. 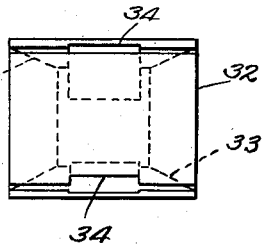 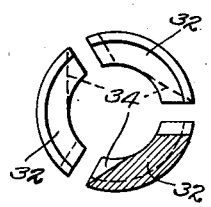 Fig.9.
Fig.10. 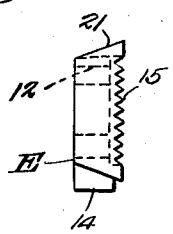 Fig.11. 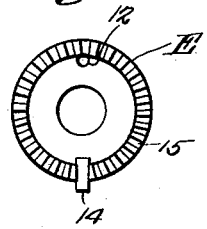 Fig.12. 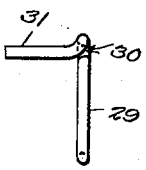 Fig.13.
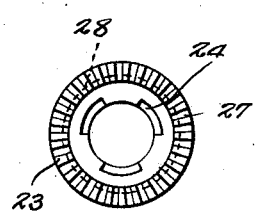 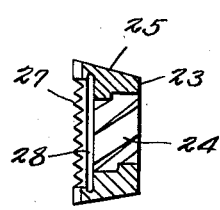
Fig.14. Fig.15.
J. M. English
INVENTOR.
BY *C. A. Snow & Co.*
ATTORNEYS.

Patented May 15, 1945

2,376,042

UNITED STATES PATENT OFFICE 2,376,042

BRAKE MECHANISM

John M. English, Norwich, Conn.

Application July 10, 1944, Serial No. 544,234

6 Claims. (Cl. 192—6)

The device forming the subject matter of this application is a brake mechanism, adapted primarily but not exclusively to be used on a bicycle.

The invention aims to provide novel means whereby the brake shoes may be applied with especial effectiveness to the hub of the wheel of the bicycle or other vehicle, novel means being incorporated whereby the vehicle may work ahead, or have its forward movement checked, at the will of an operator.

Another object of the invention is to supply a novel operative connection between the clutch member and the expander.

Another object of the invention is to supply a novel structure cooperating with the brake shoes and the brake support, whereby an unusually strong braking effort may be attained.

Another object of the invention is to supply a novel bearing construction whereby the complete hub brake is strengthened greatly and the axle relieved of severe braking strain.

Within the scope of what is claimed, the structure described and shown may be changed, without departing from the spirit of the invention.

In the drawings:

Fig. 5 is an end elevation of the support;

Fig. 6 is a side elevation of the support;

Fig. 7 is an elevation showing the opposite end of the support from that depicted in Fig. 5;

Fig. 8 is an elevation showing in side view, one of the brake shoes;

Fig. 9 is an end elevation disclosing the brake shoes;

Fig. 10 is a side elevation of the expander;

Fig. 11 is an end elevation of the expander;

Fig. 12 is an elevation of the grip ring;

Fig. 13 is an elevation wherein the grip ring is viewed at right angles to the showing of Fig. 12;

Fig. 14 is an elevation of the clutch member;

Fig. 15 is a sectional view of the clutch member.

Figure 1:
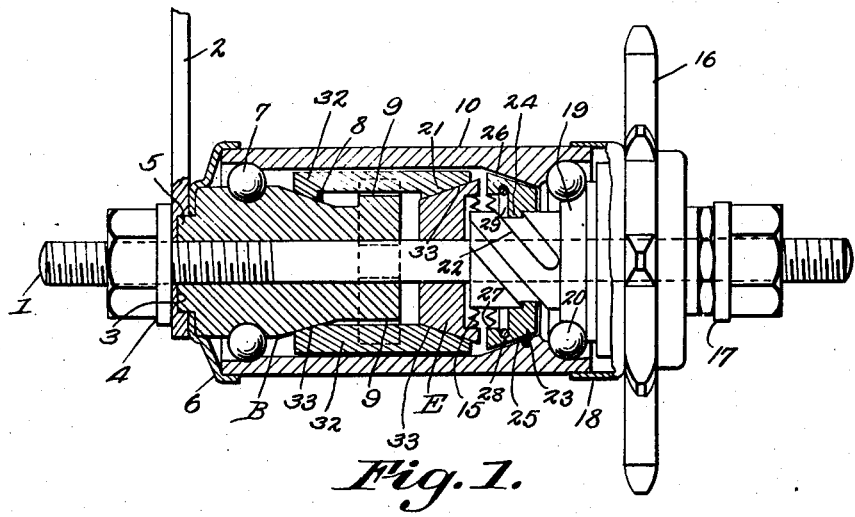
Fig. 1 shows, in longitudinal section, a device constructed in accordance with the invention, parts being left in elevation.

The numeral 1 marks an axle, adapted to be fixed in the frame of a bicycle or other vehicle. An arm 2 is mounted on the axle 1 and is connected in the usual way to the bicycle frame (not shown). The arm 2 has an inner recess 3. A nut and washer structure 4 is threaded on the axle 1, and engages the arm 2.

The letter B designates a brake support, threaded on the axle 1. The brake support B has an end lug 5, received against rotation in the recess 3 of the arm 2. In view of the foregoing, the brake support B is fixed against rotation. A cap 6 is mounted on the lug 5 and is bound between the brake support B and the arm 2. The brake support B is surrounded by an anti-friction bearing 7.

The support B has a conical portion 8, at the inner end of which are disposed outstanding lugs 9. The lugs 9 will be described in detail hereinafter.

A hub 10 is mounted to rotate on the anti-friction bearing 7. The hub 10 is carried for rotation on the support B otherwise than by means of the bearing 7, a structure to be described hereinafter. It is not necessary to describe the hub 10 in detail, because much of its specific structure forms no part of the present invention. The hub 10 carries a wheel 11.

A conical expander E is mounted on the axle 1 for movement longitudinally of the axle. Adjacent to its periphery, the expander E is supplied with a transverse opening 12, or equivalent means to an end to be referred to hereinafter. The expander E is supplied with a radially outstanding finger 14. At one end, the expander E has a clutch surface 15. The expander E has a conical outer surface 21.

A driving rotor for the wheel 11 is supplied, and may be a sprocket wheel 16, held at 17, by any appropriate means for rotation on the axle 1. The sprocket wheel 16 includes a cap 18, receiving the adjacent end of the hub 10. The sprocket wheel 16 includes a reduced neck 19. The neck 19 is surrounded by an anti-friction bearing 20, received in one end of the hub 10. The neck 19 of the sprocket wheel 16 is provided with a thread 22.

The numeral 23 designates an annular clutch member mounted on the neck 19 of the sprocket wheel 16. The clutch member 23 is internally threaded, as at 24, to cooperate with the thread 22 of the neck 19 of the sprocket wheel 16. The member 23 has an external, conical clutch surface 25. The clutch surface 25 of the member 23 is adapted to cooperate, under circumstances to be pointed out hereinafter, with an internal, clutch surface 26 on the hub 10 of the wheel 11. At its inner end, the member 23 is supplied with a clutch surface 27. The clutch surface 27 of the member 23 is adapted to cooperate with the clutch surface 15 of the expander E.

The clutch member 23 is supplied with an internal, circumferential groove 28, in which is mounted an expansibly-resilient ring 29, divided as shown at 30, in Fig. 12 and provided at one end with a laterally extended projection or finger 31, received for longitudinal sliding movement in the seat 12 of the expander E.

The conical portion 8 of the brake support B and the conical portion 21 of the expander E are surrounded by a plurality of brake shoes 32. The brake shoes 32 are internally coned as at 33, to cooperate with the surfaces 8 and 21 of the brake support B and the expander E, respectively. On their adjacent, longitudinal edges, the brake shoes 32 are notched, as shown at 34, to define openings. The lugs 5 of the brake support B are received in the said openings. The projection 14 on the expander E is received between two of the brake shoes 32.

Figure 4:
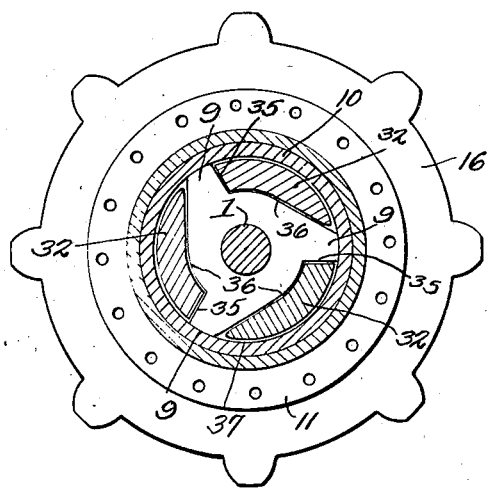
Fig. 4 is a transverse section taken approximately on the line 4—4 of Fig. 3.

Referring to Fig. 4, it will be noted that each lug 9 of the brake support B has a substantially radial shoulder 35, and from the inner end of the shoulder there extends to the outer end of the next adjoining lug, a circumferentially inclined surface 36 which cooperates with the inner surface or bore of the hub 10, to define a circumferentially extended, wedge-shaped opening 37. The brake shoes 32 occupy the openings or spaces 37. The end surfaces of the lugs 9 have approximately the same radius of curvature as the bore of the hub 10 and fit slidably therein, to form a solid supporting bearing in the central section of the assembled hub brake.

At this place a memorandum is made concerning the relation of sundry parts so far as relative rotation is concerned.

Figure 3:
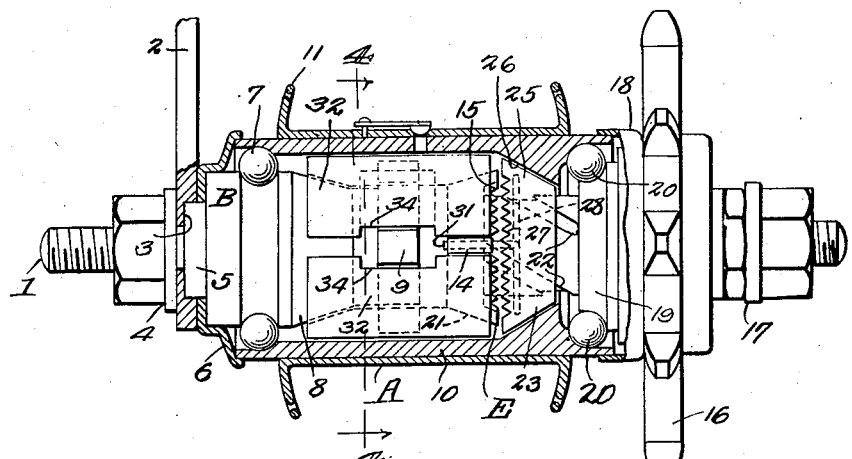
Fig. 3 is a sectional view wherein parts remain in elevation, the viewpoint being disposed approximately ninety degrees from the viewpoint in Fig. 1.

The support B does not rotate, since its lug 5 is received in the recess 3 of the fixed arm 2. Nor do the shoes 2 rotate, inasmuch as they are disposed between the lugs 9 of the support B. The finger 14 of the expander E (Fig. 3) is received between two adjoining shoes 32, and the expander does not rotate. The ring 29 has no rotation, because its finger 31 is received in the opening 12 of the expander E. The clutch member 23 rotates with respect to the ring 29. When the clutch member 23 is moved inwardly, it engages the expander E, and those parts move together as a unit, longitudinally of the axle 1.

Figure 2:
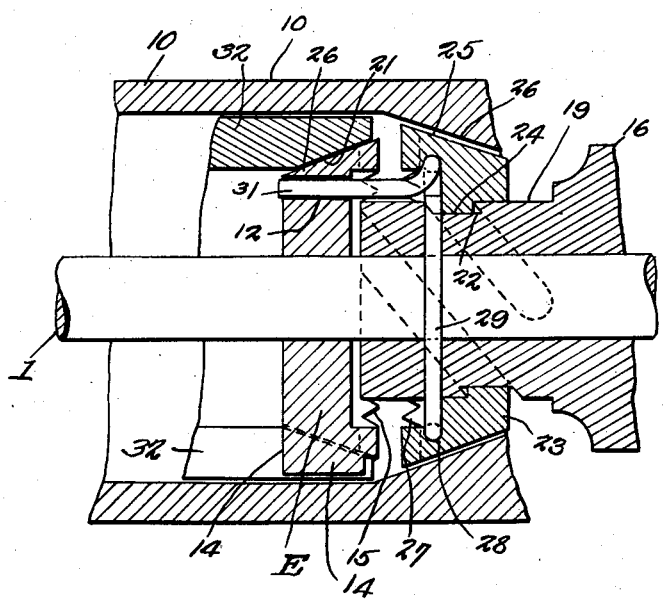
Fig. 2 is a longitudinal section wherein parts are broken away, the cutting plane in Fig. 2 being disposed about at right angles to the cutting plane in Fig. 1.

When the spocket wheel 16 is working ahead, the threaded engagement between the neck 19 of the sprocket wheel and the clutch member 23, shown at 22—24, carries the clutch member to the right in Fig. 2, until the conical surface 25 of the clutch member is engaged with the conical surface 26 of the hub 10, and forward rotation is imparted to the wheel 11.

When the rider of the bicycle back-pedals, the threaded engagement 22—24 between the neck 19 of the sprocket wheel 16 and clutch member 23 moves the clutch member 23 to the left in Fig. 2 until the clutch elements 27 of the member 23 engage the clutch elements 15 of the expander E. The expander E is thus carried to the left in Fig. 2, the conical surface 21 of the expander cooperating with the conical surfaces 26 of the shoes 32. The shoes 32 are carried outwardly, in a radial direction, and cooperate with the bore of the hub 11 under strong braking pressure, to check the forward movement of the bicycle.

Referring to Fig. 4, the forward rotation of the wheel 11, when the braking operation is initiated, causes the shoes to ride along the edges 36 of Fig. 4 on the brake support B, and the shoes not only are carried outwardly, but, as well, they are wedged in the spaces 37 of Fig. 4, an additional and important braking effect being produced.

Attention is called to the fact that the projection 31 is located in a circle the radius of which is shorter than the radius of the circle which defines the outer circumference of the resilient ring 29. When the clutch member 23 is working ahead (to wit, rotating clockwise) there is a tendency to contract the ring 29, the ring has little hold on the clutch member, and the clutch member rotates with respect to the ring, an automatic release being accomplished. When a reverse (counter-clockwise) rotation of the clutch member 23 is brought about, the ring 29 is expanded, and a coupling of the clutch member to the expander E occurs.

The device forming the subject matter of this application is simple in construction, but it will be found thoroughly advantageous, and capable of carrying out the objects set forth in the opening portion of this specification and alluded to elsewhere.

What is claimed is:

1. A brake comprising a fixed axle, a support fixed to the axle and having a conical surface, the support having outstanding lugs located inwardly of the conical surface, each lug having an approximately radial shoulder and having a circumferentially-inclined surface leading therefrom to the outer end surface of the next-adjoining lug, an expander mounted on the axle for inward and outward movement longitudinally thereof and having a conical surface, a wheel hub, an anti-friction bearing interposed between the support and the bore of the hub and disposed outwardly of the conical surface of the support, the bore of the hub cooperating with the shoulders and with the circumferentially-inclined surfaces to define circumferentially-extended, wedge-shaped spaces, the outer end surfaces of the lugs having the same radius of curvature as the bore of the hub, and being in engagement therewith, to form a frictional support for the hub, inwardly of the conical surface of the support, brake shoes in said spaces and engageable with the conical surfaces, to cause the shoes to expand and engage the bore of the hub when the expander is moved inwardly, and mechanism for moving the expander inwardly and outwardly, said mechanism comprising a driving rotor supported for rotation on the axle, the shoes engaging in the wedge-shaped spaces when the rotor comes to rest, thereby to afford a braking effect supplemental to that produced by the aforesaid expansion of the shoes.

2. A brake comprising a fixed axle, a support fixed to the axle and having a conical surface, the support having outstanding lugs located inwardly of the conical surface, an expander mounted on the axle for inward and outward movement longitudinally thereof and having a conical surface, a wheel hub mounted to rotate on the support, brake shoes engageable with the conical surfaces, to cause the shoes to expand and engage the bore of the hub when the expander is moved inwardly, the end surfaces of the lugs having the same radius of curvature as the bore of the hub and fitting closely but slidably therein to afford a bearing for the hub intermediate the ends thereof, and mechanism for moving the expander inwardly and outwardly, said mechanism comprising a driving rotor supported for rotation on the axle, a member threaded on the rotor, and a connection joining said member and the expander for clockwise rotation together and affording relative movement between them, longitudinally of the axle, said member and the expander being provided with clutch elements which are interengaged and disengaged when the expander is moved inwardly and outwardly, respectively.

3. A brake constructed as set forth in claim 2, and wherein the expander and said member constitute cooperating parts of the brake, one of said cooperating parts having an internal circumferential groove, the connection being a divided ring detachably mounted in the groove and provided with a lateral projection, the other of said cooperating parts having a seat receiving the projection for longitudinal sliding movement.

4. A brake constructed as set forth in claim 2, and wherein said member is provided with an internal circumferential groove, the connection being a ring resiliently and detachably mounted in the groove, and provided with a lateral projection, the expander having a seat receiving the projection for longitudinal sliding movement.

5. A brake comprising a fixed axle, a support fixed to the axle and having a conical surface, the support having outstanding lugs located inwardly of the conical surface, an expander mounted on the axle for inward and outward movement longitudinally thereof and having a conical surface, a wheel hub mounted to rotate on the support, brake shoes engageable with the conical surfaces to cause the shoes to expand and engage the bore of the hub when the expander is moved inwardly, mechanism for moving the expander inwardly and outwardly, said mechanism comprising a driving rotor supported for rotation on the axle, a member threaded on the rotor and having a recess, a resilient ring within the recess and having a lateral projection mounted on the expander for movement longitudinally of the axle, the projection being located in a circle the radius of which is shorter than the radius of the recess, whereby when the rotor turns clockwise the ring is contracted to enable said member to rotate with respect to the ring, and whereby when the rotor turns counterclockwise the ring will be expanded and caused to grip said member, said member and the expander being provided with clutch elements are interengaged and disengaged when the expander is moved inwardly and outwardly, respectively.

6. A brake constructed as set forth in claim 2, and wherein said member is provided with an internal circumferential groove, the connection being a ring resiliently and detachably mounted in the groove, and provided with a lateral projection, the expander having a seat receiving the projection for longitudinal sliding movement, the expander constituting means for holding the ring against rotation, and said member having clockwise rotation with respect to the ring, said member and the ring having movement as a unit, longitudinally of the axle.

JOHN M. ENGLISH.